United States Patent
Schnur et al.

(10) Patent No.: US 10,583,763 B1
(45) Date of Patent: Mar. 10, 2020

(54) VEHICLE FLOOR MAT WITH STOWABLE BARRIERS

(71) Applicant: Faurecia Interior Systems, Inc., Auburn Hills, MI (US)

(72) Inventors: Brett Schnur, Farmington Hills, MI (US); Maxime Salandre, Rochester, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 2 days.

(21) Appl. No.: 16/113,582

(22) Filed: Aug. 27, 2018

(51) Int. Cl.
*B60N 3/04* (2006.01)
*B60R 5/04* (2006.01)
*B60R 7/02* (2006.01)
*B60R 7/04* (2006.01)
*B60R 13/01* (2006.01)

(52) U.S. Cl.
CPC ............ *B60N 3/048* (2013.01); *B60N 3/046* (2013.01); *B60R 5/04* (2013.01); *B60R 7/02* (2013.01); *B60R 7/04* (2013.01); *B60R 13/011* (2013.01)

(58) Field of Classification Search
CPC .......... B60N 3/04; B60N 3/044; B60N 3/046; B60N 3/048; B60P 7/0892; B60P 7/10; B60P 7/14; B60R 5/04; B60R 7/02; B60R 7/04; B60R 2011/0029; B60R 2011/0036; B60R 13/011; B60R 13/013; B60R 2013/016
USPC ..... 296/24.4, 37.1, 37.8, 37.6, 37.14, 37.16, 296/97.23, 39.1
See application file for complete search history.

(56) References Cited

U.S. PATENT DOCUMENTS

| | | | | |
|---|---|---|---|---|
| 4,280,729 A | * | 7/1981 | Morawski | B60N 3/044 15/215 |
| 4,540,213 A | * | 9/1985 | Herlitz | B60R 7/02 211/195 |
| 5,961,262 A | * | 10/1999 | Weber | B60R 7/02 410/121 |
| 6,247,741 B1 | * | 6/2001 | Seel | B60R 5/00 296/37.14 |
| 6,254,162 B1 | * | 7/2001 | Faber | B60P 7/0892 224/497 |
| 7,300,088 B1 | * | 11/2007 | Catenacci | B60N 2/3047 296/37.14 |

(Continued)

FOREIGN PATENT DOCUMENTS

CN  105686596 A  6/2016
CN  206006807 U  3/2017
(Continued)

*Primary Examiner* — Gregory A Blankenship
(74) *Attorney, Agent, or Firm* — Reising Ethington P.C.

(57) ABSTRACT

A vehicle floor mat for a passenger foot well or a cargo area of an automotive vehicle comprising a mat body and first and second barriers mounted to the mat body. The first and second barriers are moveable between a stowed position, in which the first and second barriers are at least partially received within the mat body, and a deployed position, in which the first and second barriers extend away from the mat body. Each of the first and second barriers comprises a support arm housed within a boot. When the first and second barriers are in the deployed position, opposing surfaces of the first and second barriers together define a confined region therebetween in which a package can be contained during transportation thereof.

15 Claims, 4 Drawing Sheets

(56) References Cited

U.S. PATENT DOCUMENTS

| | | | |
|---|---|---|---|
| 7,527,312 B1* | 5/2009 | Cucknell | B60R 5/04 |
| | | | 296/193.07 |
| 9,282,843 B1 | 3/2016 | Al-Anzi | |
| 2004/0091674 A1 | 5/2004 | Altshuler | |
| 2005/0045682 A1* | 3/2005 | Tarrant | B60R 7/02 |
| | | | 224/498 |
| 2005/0087530 A1* | 4/2005 | Svenson | B60R 7/02 |
| | | | 220/6 |
| 2007/0257501 A1* | 11/2007 | Smith | B60R 11/00 |
| | | | 296/37.6 |
| 2009/0146445 A1* | 6/2009 | Bernhardsson | B60R 11/00 |
| | | | 296/37.14 |
| 2011/0062742 A1* | 3/2011 | Alford | B60N 3/044 |
| | | | 296/97.23 |
| 2014/0354003 A1* | 12/2014 | Murray | B60R 5/04 |
| | | | 296/37.16 |
| 2016/0144800 A1* | 5/2016 | Henderson | B60R 13/013 |
| | | | 296/24.4 |
| 2017/0355322 A1* | 12/2017 | Navarrete | B60P 7/0892 |
| 2018/0015883 A1* | 1/2018 | Loew | B60R 7/02 |
| 2018/0134214 A1* | 5/2018 | Yoon | B60N 3/04 |
| 2018/0215326 A1* | 8/2018 | Barrera Munoz | B62D 43/10 |
| 2018/0229642 A1* | 8/2018 | Kaatz | B60R 5/04 |
| 2019/0202334 A1* | 7/2019 | Bhirud | B60R 7/08 |
| 2019/0270397 A1* | 9/2019 | Owens | B60N 3/044 |

FOREIGN PATENT DOCUMENTS

| | | |
|---|---|---|
| CN | 107713677 A | 2/2018 |
| CN | 207055321 U | 3/2018 |
| CN | 107898272 A | 4/2018 |

* cited by examiner

VEHICLE FLOOR MAT WITH STOWABLE BARRIERS

TECHNICAL FIELD

The present disclosure relates to a vehicle floor mat and, in particular, to a vehicle floor mat for securing objects in position on a floor of a vehicle during transportation thereof.

BACKGROUND

Floor mats are oftentimes configured for use in areas of automotive vehicles that tend to experience high wear or are frequently exposed debris to protect an underlying floor of the vehicle. For example, floor mats are commonly placed over driver foot well areas, front passenger foot well areas, rear passenger foot well areas, and/or cargo areas of automotive vehicles.

Packages and other articles, such as groceries and personal items, are frequently transported in automotive vehicles and may be placed on the floor of the vehicle during transportation thereof. However, it is common for such articles to shift during movement of the vehicle, possibly causing damage to the article or the vehicle, and potentially creating an unwanted distraction for a driver of the vehicle. Therefore, there is a need in the art for a vehicle floor mat that can effectively protect the floor area of an automotive vehicle and also can help secure and prevent movement of an article that is placed on the floor mat during operation of the vehicle.

SUMMARY

In accordance with one or more embodiments, a vehicle floor mat comprises: a mat body and first and second barriers mounted to the mat body. The mat body includes a top surface and an opposite bottom surface and is configured to conform to and overlie a surface defined by a passenger foot well or a cargo area of an automotive vehicle. The first and second barriers are moveable between a stowed position, in which the first and second barriers are at least partially received within the mat body, and a deployed position, in which the first and second barriers extend in a vertical direction away from the mat body. Each of the first and second barriers comprises a support arm coupled to the mat body at a proximal end thereof, and a boot coupled to a distal end of the support arm and extending from the distal end of the support arm to the top surface of the mat body. When the first and second barriers are in the stowed position, the proximal and distal ends of the support arms are at least partially received within the mat body. When the first and second barriers are in the deployed position, the proximal and distal ends of the support arms extend in a vertical direction away from the top surface of the mat body. When the first and second barriers are in the deployed position, opposing surfaces of the first and second barriers together define a confined region therebetween in which a package can be contained during transportation thereof.

The support arms of the first and second barriers may be respectively housed within cavities defined by the boots of the first and second barriers.

Each of the boots may include a roof and a sheath depending from the roof and extending in a vertical direction from the roof to the top surface of the mat body. In such case, the distal ends of the support arms of the first and second barriers may be respectively coupled to undersides of the roofs of the boots of the first and second barriers.

When the first and second barriers are in the stowed position, sheaths of each of the boots may collapse upon themselves around the distal ends of the support arms of the first and second barriers.

A plurality of support holes may be formed in the mat body and may extend between the top and bottom surfaces of the mat body. In such case, the proximal ends of the support arms of the first and second barriers each may be coupled to a base that is received within one of the support holes in the mat body. The proximal ends of the support arms may be at least partially received within a corresponding one of the bases, when the first and second barriers are in the stowed position.

Each base may be at least partially supported within one of the support holes by a plug that extends between the base and the bottom surface of the mat body. In such case, an inner surface of each support hole may include a nib and each of the plugs may include a recess. And, when the plugs are inserted into the support holes from the bottom surface of the mat body, the nibs of support holes may snap into the recesses defined in the plugs to lock the plugs into position within the support holes.

The support arms of the first and second barriers each may be defined by a plurality of nesting segments. In such case, when the first and second barriers are in the stowed position, the nesting segments of the first and second barriers may be respectively slidably received within one another. And, when the first and second barriers are in the deployed position, the nesting segments of the first and second barriers may be respectively stacked relative to one another.

The support arms of the first and second barriers each may be defined by an innermost nesting segment having a first diameter, an outermost nesting segment having a second diameter greater than the first diameter, and one or more intermediate nesting segments extending between the innermost and outermost nesting segments.

The support arms of the first and second barriers may allow the first and second barriers to respectively move upward and downward between the stowed position to the deployed position.

The support arms of the first and second barriers may allow free ends of the first and second barriers to be respectively positioned at any one of several distances away from the top surface of the mat body.

The first and second barriers each may include two or more support arms coupled to the mat body. In such case, the support arms of the first and second barriers may be respectively housed within cavities defined by the boots of the first and second barriers. In one form, the boot of the first barrier may extend entirely around the support arms of the first barrier and the boot of the second barrier may extend entirely around the support arms of the second barrier.

The top surface of the mat body may include a plurality of raised ribs separated by a plurality of channels.

The mat body and the boots of the first and second barriers may be formed via injection molding processes.

In one form, the vehicle floor mat also may comprise third and fourth barriers mounted to the mat body and moveable between a stowed position, in which the third and fourth barriers are at least partially received within the mat body, and a deployed position, in which the third and fourth barriers extend in a vertical direction away from the mat body. Each of the third and fourth barriers may comprise a support arm coupled to the mat body at a proximal end thereof, and a boot coupled to a distal end of the support arm and extending from the distal end of the support arm to the top surface of the mat body. In such case, the first, second, third, and fourth barriers may be respectively located along first, second, third, and fourth sides of a package placement area on the vehicle floor mat. And, when the first, second, third, and fourth barriers are in the deployed position, the confined region may be defined by the opposing surfaces of the first and second barriers and opposing surfaces of the third and fourth barriers.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Exemplary embodiments will hereinafter be described in conjunction with the appended drawings, wherein like designations denote like elements, and wherein.

DETAILED DESCRIPTION

The floor mat described below is configured for use in an automotive vehicle and includes multiple barriers that, when in a deployed position, can create a confined region on the floor mat in which a package or other article can be contained during transportation thereof. In the deployed position, the barriers extend in a generally vertical direction from a body of the floor mat and effectively limit horizontal movement of any packages or other articles that have been placed within the confined region on the floor mat. When not in use, the barriers may be moved to a stowed position in which the barriers collapse toward the floor mat and are at least partially received within the body of the floor mat.

Figure 1:
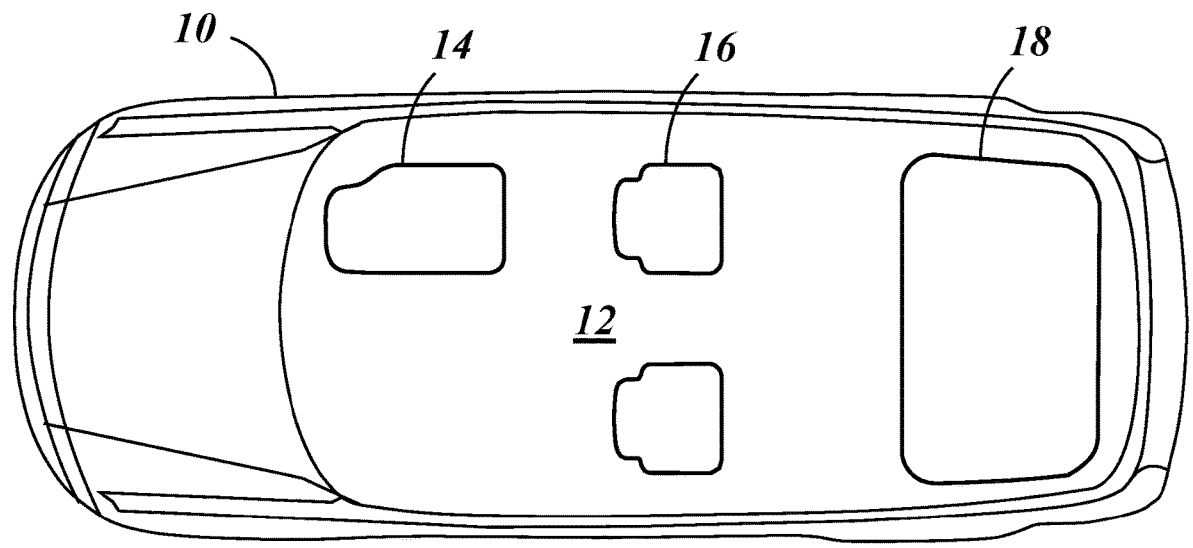
FIG. 1 is a top view of an automotive vehicle depicting the location of a front passenger's side foot well, rear passenger foot wells, and a trunk or cargo area of the vehicle.

As shown in FIG. 1, the floor mats described below may be configured to conform to and overlie various areas on a floor 12 of an automotive vehicle 10. Such areas within the vehicle 10 may be areas where a driver or passenger of the vehicle 10 may desire to temporarily place and secure a package within the vehicle 10 during transportation. For example, the floor mats described below may be configured for use in a front passenger foot well 14, a rear passenger foot well 16, or a cargo area 18 of the vehicle 10.

Figure 2:
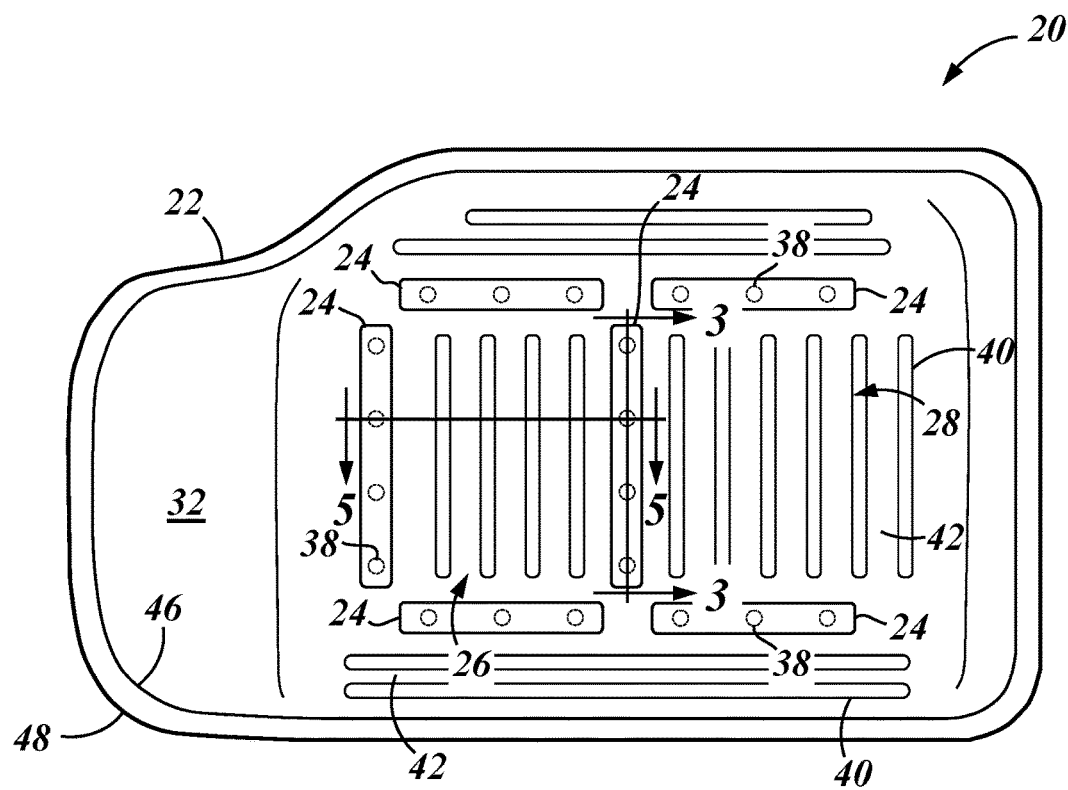
FIG. 2 is a top view of a floor mat sized to fit within a front passenger's side foot well of a vehicle, the floor mat including a plurality of barriers that can be moved from a stowed position adjacent a body of the floor mat to a deployed position to help contain a package within a confined region on the floor mat.

FIG. 2 illustrates an exemplary vehicle floor mat 20 adapted to conform to and overlie a front passenger foot well 14 of an automotive vehicle 10. The vehicle floor mat 20 includes a mat body 22 and a plurality of stowable barriers 24 mounted to the mat body 22. In the embodiment depicted in FIG. 2, some of the barriers 24 are arranged on the floor mat 20 surrounding a first package placement area 26 on the floor mat 20 and some of the barriers 24 are arranged on the floor mat 20 around a second package placement area 28. However, other arrangements are certainly possible. In addition, although six barriers 24 are depicted in FIG. 2, in other embodiments, the number of barriers 24 may be less than or greater than six.

Figure 3:
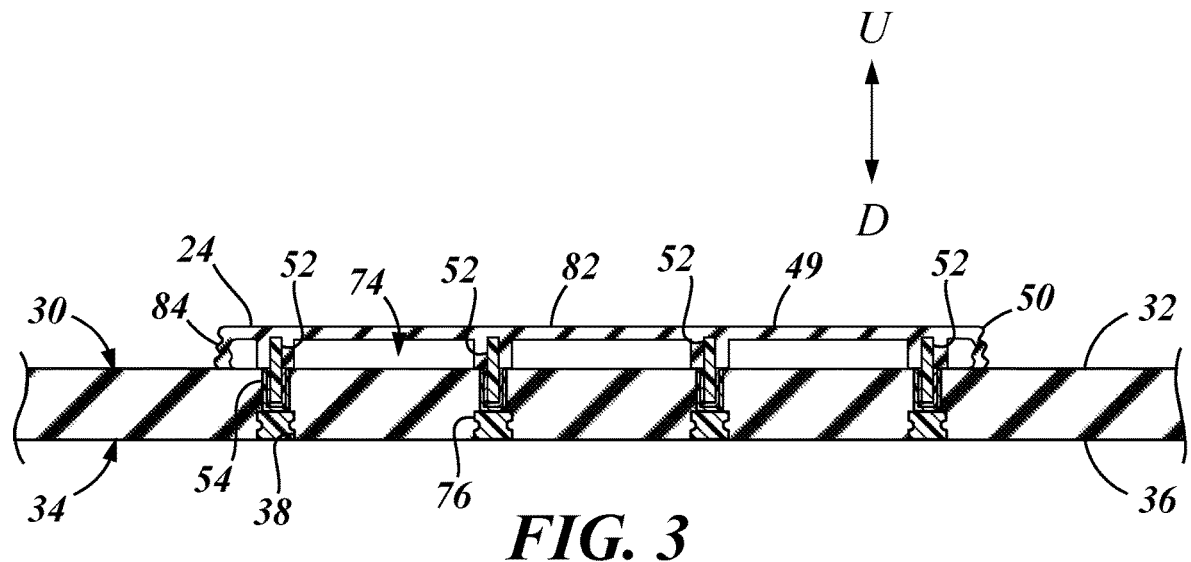
FIG. 3 is a side cross-sectional view of a portion of the floor mat of FIG. 2 taken along line 3-3 and depicting one of the barriers in a stowed position.

As shown best in FIGS. 2 and 3, the mat body 22 includes a top side 30 defining a top surface 32, a bottom side 34 defining a bottom surface 36, and a plurality of support holes 38 extending between the top and bottom surfaces 32, 36. A plurality of ribs 40 separated by a plurality of channels 42 may be formed on the top side 30 of the body 22 to help channel liquid and/or debris to certain regions above the top surface 32 of the body 22 and to help hold a package 44 or an occupant of the vehicle 10 above the top surface 32 of the body 22 and above any liquid and/or debris on the top surface 32 of the body 22. A lip 46 may be formed along an outer periphery 48 of the mat body 22 to help contain liquid and/or debris within the outer periphery 48 of the mat body 22. The mat body 22 may be made of rubber or another flexible, elastomeric material, e.g., ethylene propylene diene rubber (EPDM), and may be formed of integral one-piece construction, such as by an injection molding process.

Upward (U) and downward (D) directions are designated in FIG. 3 and may be referred to as vertical directions. Directions parallel to a plane defined by the top surface 32 of the mat body may be referred to as horizontal directions.

Figure 4:
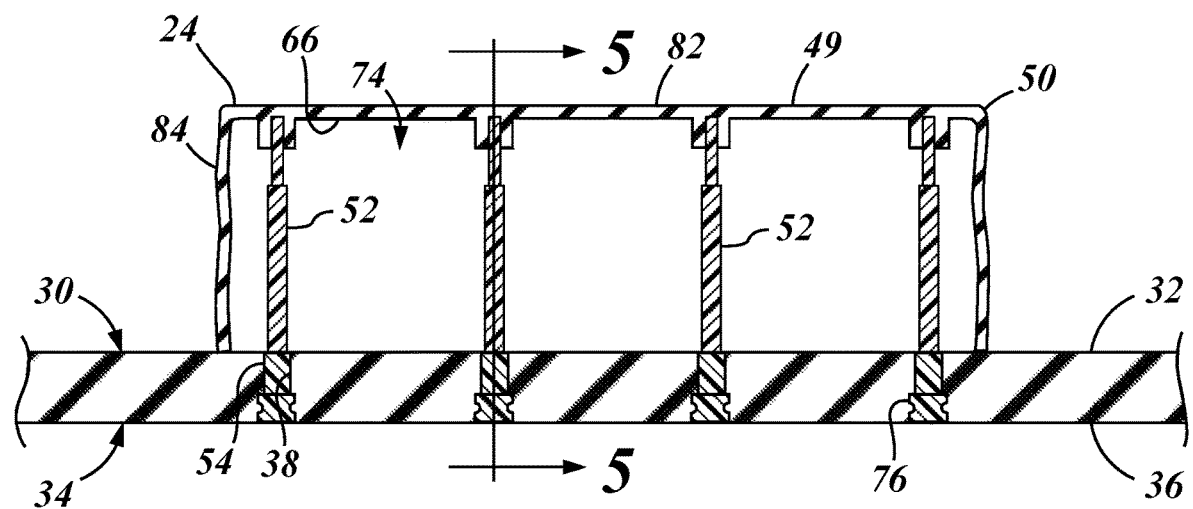
FIG. 4 is a side cross-sectional view of the barrier of FIG. 3 in a deployed position.

The barriers 24 are mounted on the mat body 22 and respectively extend from the top surface 32 of the mat body 22 to a free end 49. Each of the barriers 24 is individually moveable upwards and downwards between a stowed position (FIG. 3) and a deployed position (FIG. 4). A best shown in FIGS. 4 and 5, each of the barriers 24 includes a boot 50 and one or more telescoping support arms 52, with each support arm 52 being coupled to a base 54 that is received within one of the support holes 38 in the mat body 22. The barrier 24 depicted in FIGS. 3 and 4 includes four telescoping support arms 52 respectively coupled to four bases 54. However, as shown in FIG. 2, in some embodiments, the floor mat 20 may include barriers 24 that are supported by less than or greater than four telescoping support arms 52.

Figure 6:
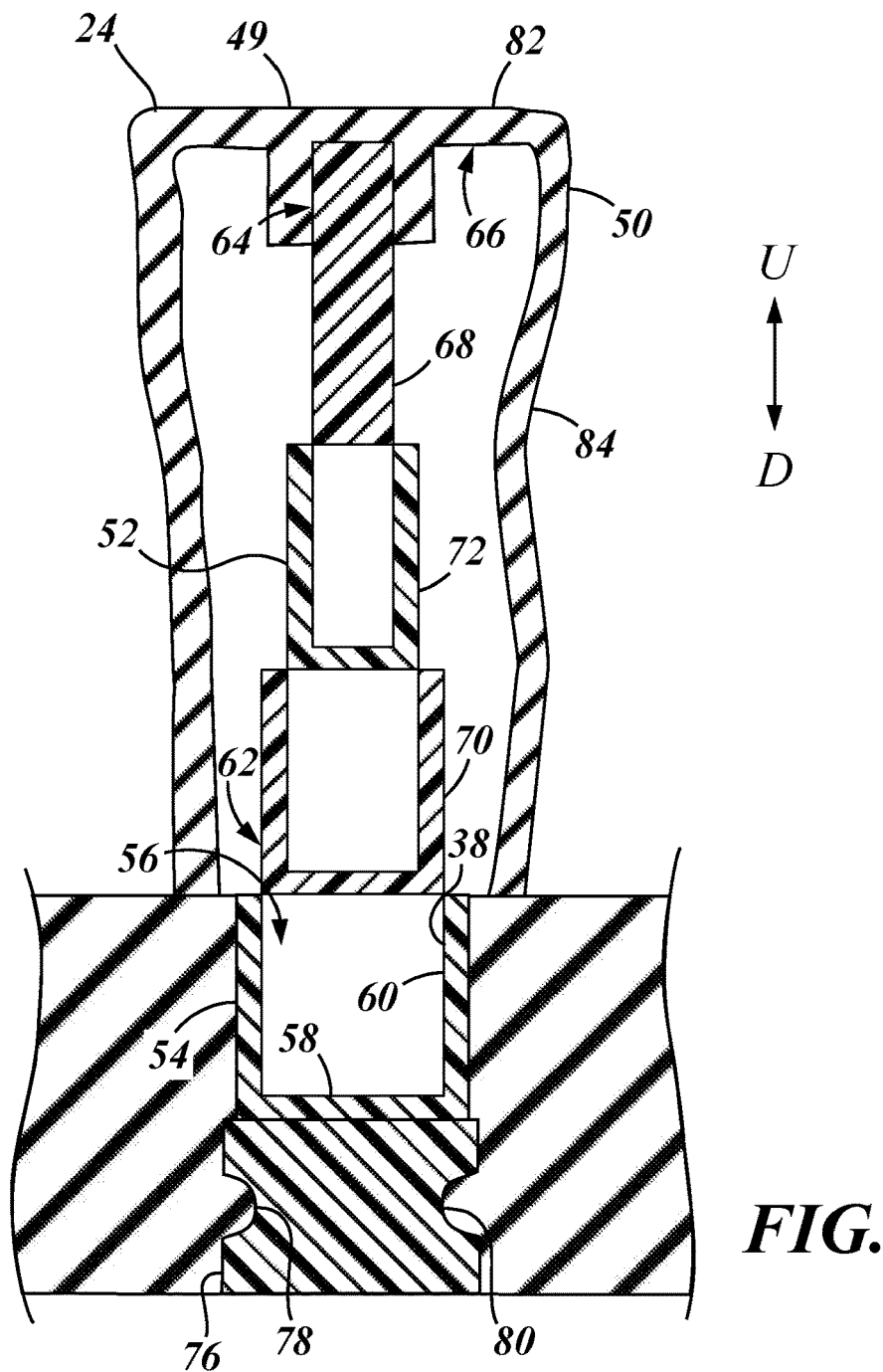
FIG. 6 is a magnified view of a portion of one of the barriers of FIG. 5 in the deployed position, the barrier including a telescoping support arm with a plurality of nesting segments stacked relative to one another.

Referring now to FIG. 6, each base 54 is configured for receipt within one of the support holes 38 in the mat body 22 and includes an opening 56 defined by a floor 58 and a sidewall 60. The opening 56 in the base 54 is configured to couple one of the telescoping support arms 52 to the mat body 22 and to receive a proximal end 62 of the telescoping support arm 52 when its associated barrier 24 is in the stowed position. Each telescoping support arm 52 includes a proximal end 62 and an opposite distal end 64. The distal end 64 of each support arm 52 is coupled to an underside 66 of its associated boot 50. Together, the telescoping support arms 52 of each barrier 24 allow the barriers 24 to move upwards and downwards, from a deployed position to a stowed position and vice versa, and also allow the free ends 49 of the barriers 24 to be positioned at any one of several distances away from the top surface 32 of the mat body 22.

Figure 7:
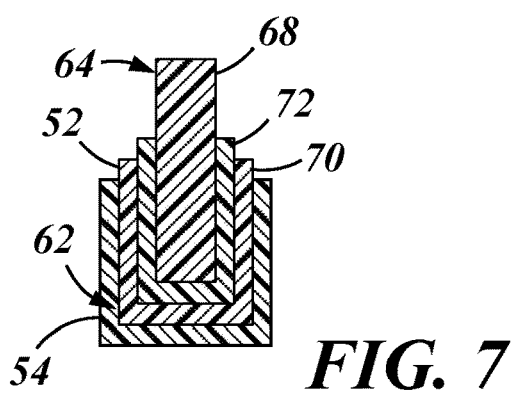
FIG. 7 is an enlarged view of the telescoping support arm of FIG. 6 wherein the nesting segments are slidably received within one another.

As best shown in FIGS. 6 and 7, in one form, each of the telescoping support arms 52 may be defined by a plurality of nesting segments, including an innermost and uppermost nesting segment 68 having a first diameter and an outermost and lowest nesting segment 70 having a second diameter larger than the first diameter. The segments 68, 70 may be separated from each other by one or more intermediate nesting segments 72. The segments 68, 70, 72 may be stacked relative to one another when the barrier 24 is in the deployed position (FIG. 6) and may be slidably received within one another when the barrier 24 is in the stowed position (FIG. 7).

The boot 50 of each barrier 24 extends from the free end 49 of the barrier 24 to the top surface 32 of the mat body 22, around the telescoping support arms 52, such that all of the support arms 52 of one barrier 24 are housed within a single cavity 74 defined by the boot 50. The boot 50 includes a roof 82 and a collapsible sheath 84 (FIG. 6). The roof 82 of the boot 50 is coupled to the distal end 64 of the telescoping support arms 52 and the sheath 84 depends from the roof 82 and extends in a generally vertical direction from the roof 82 to the top surface 32 of the mat body 22.

The boot 50 may be made of an elastomeric material and may be formed in situ and simultaneously bonded to the top surface of the mat body 22, for example, using an injection molding process. Thereafter, the telescoping support arms 52 may be inserted into the cavity 74 via their respective support holes 38 and may be followed by and bases 54. The distal ends 64 of the telescoping support arms 52 may be coupled to the underside 66 of the boot 50, for example, using adhesive or glue. Each of the telescoping support arms 52 and bases 54 may be respectively secured within the cavity 74 and the support hole 38 by a plug 76. As best shown in FIG. 6, the inner surface of each of the support holes 38 may include a horizontally extending nib 78 and each of the plugs 76 may include a corresponding recess 80 so that, when the plugs 76 are inserted into the support holes 38, the nibs 78 snap into the recesses 80 and lock the plugs 76 into position within the support holes 38.

When the barrier 24 is in the stowed position, the distal ends 64 of the telescoping support arms 52 are brought towards the base 54 so that the telescoping support arms 52 collapse and are at least partially received within the base 54 in the mat body 22. At the same time, the sheath 84 of the boot 50 collapses upon itself around the distal ends 64 of the telescoping support arms 52. A user may move the barriers 24 from the stowed position to the deployed position by grasping the free end 49 of the barriers 24 and pulling the barriers 24 in an upward direction so that the roof 82 of the boot 50 and the distal ends 64 of the telescoping support arms 52 move away from the base 54 and the mat body 22 and the sheath 84 of the boot 50 unfolds and is elongated in the vertical direction.

Figure 5:
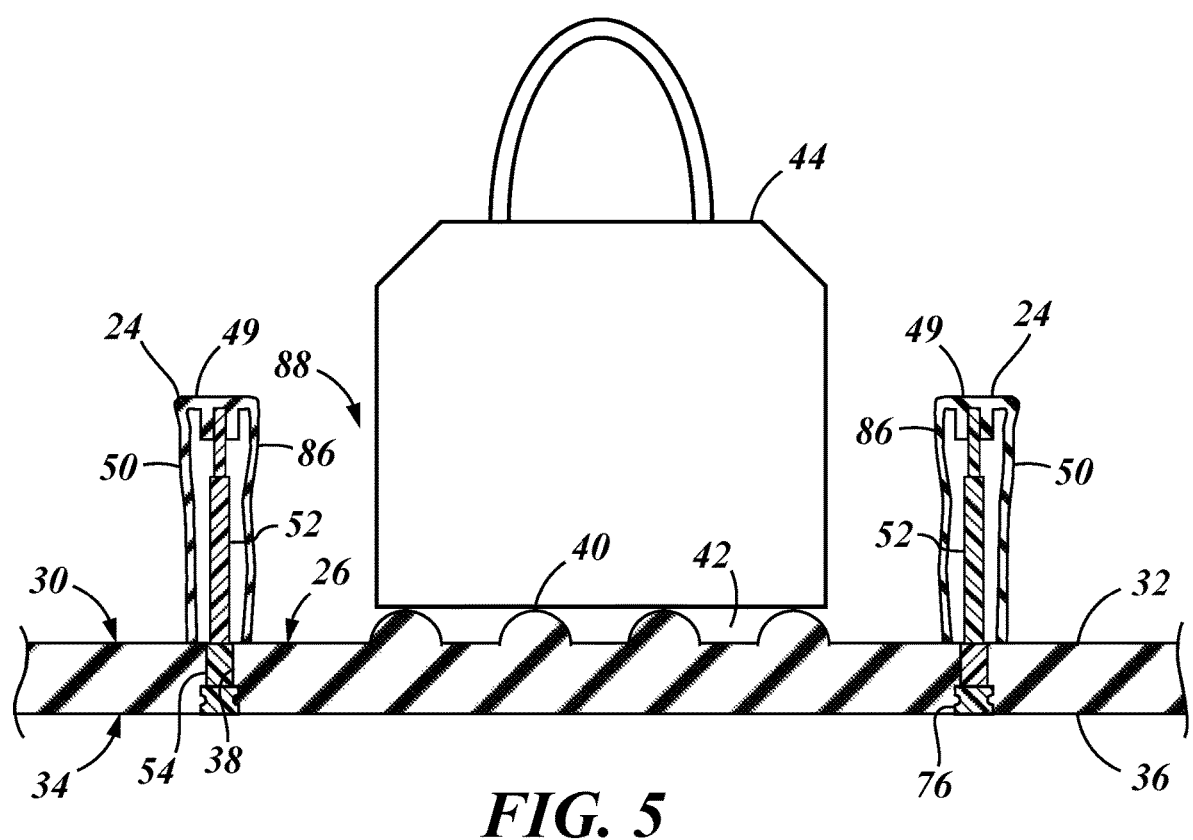
FIG. 5 is a side cross-sectional view of a portion of the floor mat of FIG. 2 taken along line 5-5 depicting two barriers in a deployed position that together define a confined region in which a packaged is contained.

The barriers 24 may be kept in the stowed position when not in use and may be moved to the deployed position when desired to hold or secure the package 44 in position on the vehicle floor mat 20. As shown in FIG. 5, when two barriers 24 on opposite sides of the package placement area 26 are in the deployed position, opposing surfaces 86 of the barriers 24 define a confined region 88 therebetween in which the package 44 can be held during transportation of the package 44 within the vehicle 10. In the deployed position, the barriers 24 can effectively contain the package 44 within the confined region 88 by limiting movement of the package 44 to within the confines of the confined region 88 and by preventing sliding movement of the package 44 beyond the barriers 44.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A vehicle floor mat comprising:
   a mat body including a top surface and an opposite bottom surface, the mat body being configured to conform to and overlie a surface defined by a passenger foot well or a cargo area of an automotive vehicle;
   first and second barriers mounted to the mat body and moveable between a stowed position, in which the first and second barriers are at least partially received within the mat body, and a deployed position, in which the first and second barriers extend in a vertical direction away from the mat body, each of the first and second barriers comprising:
      a support arm coupled to the mat body at a proximal end thereof, and
      a boot coupled to a distal end of the support arm and extending from the distal end of the support arm to the top surface of the mat body,
   wherein, when the first and second barriers are in the stowed position, the proximal and distal ends of the support arms are at least partially received within the mat body,
   wherein, when the first and second barriers are in the deployed position, the proximal and distal ends of the support arms extend in a vertical direction away from the top surface of the mat body, and
   wherein, when the first and second barriers are in the deployed position, opposing surfaces of the first and second barriers together define a confined region therebetween in which a package can be contained during transportation thereof.

2. A vehicle floor mat as defined in claim 1, wherein the support arms of the first and second barriers are respectively housed within cavities defined by the boots of the first and second barriers.

3. A vehicle floor mat as defined in claim 1, wherein each of the boots includes a roof and a sheath depending from the roof and extending in a vertical direction from the roof to the top surface of the mat body.

4. A vehicle floor mat as defined in claim 3, wherein the distal ends of the support arms of the first and second barriers are respectively coupled to undersides of the roofs of the boots of the first and second barriers and/or, when the first and second barriers are in the stowed position, the sheaths of each of the boots collapse upon themselves around the distal ends of the support arms of the first and second barriers.

5. A vehicle floor mat as defined in claim 1, comprising a plurality of support holes extending between the top and bottom surfaces of the mat body, wherein the proximal ends of the support arms of the first and second barriers are each coupled to a base that is received within one of the support holes in the mat body.

6. A vehicle floor mat as defined in claim 5, wherein, when the first and second barriers are in the stowed position, the proximal ends of the support arms are at least partially received within their corresponding base.

7. A vehicle floor mat as defined in claim 5, wherein each base is at least partially supported within one of the support holes by a plug that extends between the base and the bottom surface of the mat body.

8. A vehicle floor mat as defined in claim 7, wherein an inner surface of each support hole includes a nib and each of the plugs includes a recess, and wherein, when the plugs are inserted into the support holes from the bottom surface of the mat body, the nibs of support holes snap into the recesses defined in the plugs to lock the plugs into position within the support holes.

9. A vehicle floor mat as defined in claim 1, wherein the support arms of the first and second barriers are each defined by a plurality of nesting segments, and wherein, when the first and second barriers are in the stowed position, the nesting segments of the first and second barriers are respectively slidably received within one another.

10. A vehicle floor mat as defined in claim 9, wherein, when the first and second barriers are in the deployed position, the nesting segments of the first and second barriers are respectively stacked relative to one another.

11. A vehicle floor mat as defined in claim 1, wherein the support arms of the first and second barriers are each defined by an innermost nesting segment having a first diameter, an outermost nesting segment having a second diameter greater than the first diameter, and one or more intermediate nesting segments extending between the innermost and outermost nesting segments.

12. A vehicle floor mat as defined in claim 1, wherein the support arms of the first and second barriers allow the first and second barriers to respectively move upward and downward between the stowed position to the deployed position.

13. A vehicle floor mat as defined in claim 1, wherein the support arms of the first and second barriers allow free ends of the first and second barriers to be respectively positioned at any one of several distances away from the top surface of the mat body.

14. A vehicle floor mat as defined in claim 1, wherein the first and second barriers each include two or more support arms coupled to the mat body, and wherein the support arms of the first and second barriers are respectively housed within cavities defined by the boots of the first and second barriers.

15. A vehicle floor mat as defined in claim 1, comprising:
third and fourth barriers mounted to the mat body and moveable between a stowed position, in which the third and fourth barriers are at least partially received within the mat body, and a deployed position, in which the third and fourth barriers extend in a vertical direction away from the mat body, each of the third and fourth barriers comprising:
a support arm coupled to the mat body at a proximal end thereof, and
a boot coupled to a distal end of the support arm and extending from the distal end of the support arm to the top surface of the mat body,
wherein, the first, second, third, and fourth barriers are respectively located along first, second, third, and fourth sides of a package placement area on the vehicle floor mat, and
wherein, when the first, second, third, and fourth barriers are in the deployed position, the confined region is defined by the opposing surfaces of the first and second barriers and opposing surfaces of the third and fourth barriers.

* * * * *